US012585161B2

(12) United States Patent
Lee et al.

(10) Patent No.: US 12,585,161 B2
(45) Date of Patent: Mar. 24, 2026

(54) LIGHT ROUTE CONTROL MEMBER AND DISPLAY DEVICE COMPRISING SAME

(71) Applicant: LG INNOTEK CO., LTD., Seoul (KR)

(72) Inventors: In Hae Lee, Seoul (KR); Byung Sook Kim, Seoul (KR); Chan Mi Ju, Seoul (KR); Young Ju Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 727 days.

(21) Appl. No.: 17/758,618

(22) PCT Filed: Jan. 8, 2021

(86) PCT No.: PCT/KR2021/000286
§ 371 (c)(1),
(2) Date: Jul. 11, 2022

(87) PCT Pub. No.: WO2021/141459
PCT Pub. Date: Jul. 15, 2021

(65) Prior Publication Data
US 2023/0044139 A1 Feb. 9, 2023

(30) Foreign Application Priority Data

Jan. 9, 2020 (KR) ........................ 10-2020-0002956
Jan. 9, 2020 (KR) ........................ 10-2020-0002962

(51) Int. Cl.
*G02F 1/167* (2019.01)
*C09J 7/10* (2018.01)
(Continued)

(52) U.S. Cl.
CPC ................ *G02F 1/167* (2013.01); *C09J 7/10* (2018.01); *C09J 7/385* (2018.01);
(Continued)

(58) Field of Classification Search
CPC .... G02F 1/167; G02F 1/1676; G02F 1/13338; C09J 7/385; C09J 7/10; C09J 2203/326; C09J 2433/00
(Continued)

(56) References Cited

U.S. PATENT DOCUMENTS 6,831,769 B2 12/2004 Holman et al.
6,998,175 B2 2/2006 Murata et al.
7,551,346 B2 6/2009 Fazel et al.
(Continued)

FOREIGN PATENT DOCUMENTS

CN 104073194 A 10/2014
CN 108375858 A * 8/2018 ............. G02F 1/167
(Continued)

OTHER PUBLICATIONS

CN 108375858 A (Year: 2018).*
(Continued)

*Primary Examiner* — William Choi
(74) *Attorney, Agent, or Firm* — Saliwanchik, Lloyd & Eisenschenk

(57) ABSTRACT

A light path control member according to an embodiment comprises: a first substrate; a first electrode disposed on the first substrate; a second substrate disposed on the first substrate; a second electrode disposed under the second substrate; a light conversion part disposed between the first electrode and the second electrode; and an adhesive layer disposed between the second electrode and the light conversion part, wherein the light conversion part comprises alternately disposed partition wall portions and accommodating portions, the accommodating portions comprise a dispersion and a plurality of light absorbing particles disposed in the dispersion, and the log volume resistivity of the adhesive layer is 9 Ω·cm to 15 Ω·cm.

18 Claims, 6 Drawing Sheets

1000

(51) Int. Cl.
    *C09J 7/38*           (2018.01)
    *G02F 1/1333*      (2006.01)
    *G02F 1/1676*      (2019.01)

(52) U.S. Cl.
    CPC ........ *G02F 1/13338* (2013.01); *G02F 1/1676*
        (2019.01); *C09J 2203/326* (2013.01); *C09J*
                             *2433/00* (2013.01)

(58) Field of Classification Search
    USPC ........................................................ 359/296
    See application file for complete search history.

(56)                References Cited

U.S. PATENT DOCUMENTS

| | | | |
|---|---|---|---|
| 7,751,667 | B2 | 7/2010 | Daniel et al. |
| 9,964,831 | B2 | 5/2018 | Whitesides |
| 10,093,837 | B2 | 10/2018 | Lu et al. |
| 10,662,354 | B2 | 5/2020 | Bzowej et al. |
| 10,795,216 | B2 | 10/2020 | Asakura et al. |
| 10,976,604 | B2 | 4/2021 | Zhang et al. |
| 2001/0055678 | A1 | 12/2001 | Murata et al. |
| 2003/0025855 | A1 | 2/2003 | Holman et al. |
| 2010/0317759 | A1* | 12/2010 | Ryu ....................... C09J 133/04 |
| | | | 521/149 |
| 2013/0171399 | A1 | 7/2013 | Kho et al. |
| 2019/0162997 | A1 | 5/2019 | Asakura et al. |
| 2020/0201118 | A1 | 6/2020 | Zhang et al. |

FOREIGN PATENT DOCUMENTS

| | | | | |
|---|---|---|---|---|
| CN | 108398812 A | | 8/2018 | |
| JP | 2004-536336 A | | 12/2004 | |
| JP | 2015-114448 A | | 6/2015 | |
| JP | 2019-95653 A | | 6/2019 | |
| KR | 2001-0105179 A | | 11/2001 | |
| KR | 10-2011-0105335 A | | 9/2011 | |
| KR | 10-2012-0075896 A | | 7/2012 | |
| KR | 10-2012-0089372 A | | 8/2012 | |
| KR | 10-1178071 B1 | | 8/2012 | |
| KR | 10-2014-0080582 A | | 7/2014 | |
| KR | 10-2015-0067717 A | | 6/2015 | |
| KR | 10-2015-0125051 A | | 11/2015 | |
| KR | 1020160096263 A | * | 8/2016 | |
| KR | 10-2018-0004879 A | | 1/2018 | |
| KR | 10-2018-0045032 A | | 5/2018 | |
| KR | 10-1974242 B1 | | 4/2019 | |
| WO | WO-9606520 A1 | * | 2/1996 | ........... H01J 29/868 |

OTHER PUBLICATIONS

Supplementary European Search Report dated Jan. 18, 2024 in European Application No. 21738356.1.
International Search Report dated Apr. 27, 2021 in International Application No. PCT/KR2021/000286.

\* cited by examiner

1000

120
220
300
210
110

210
110

OPEN MODE

PRIVACY MODE

1

LIGHT ROUTE CONTROL MEMBER AND DISPLAY DEVICE COMPRISING SAME

CROSS-REFERENCE TO RELATED APPLICATIONS

This application is the U.S. national stage application of International Patent Application No. PCT/KR2021/000286, filed Jan. 8, 2021, which claims the benefit under 35 U.S.C. § 119 of Korean Application No. 10-2020-0002956, filed Jan. 9, 2020, and Korean Application No. 10-2020-0002962, filed Jan. 9, 2020, the disclosures of each of which are incorporated herein by reference in their entirety.

TECHNICAL FIELD

An embodiment relates to a light route control member having improved dispersion and shielding properties and a display device including the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to prevent glare, or to prevent the inside from being visible from the outside.

That is, the light-shielding film may be a light route control member that controls a movement path of light, block light in a specific direction, and transmit light in a specific direction. Accordingly, by controlling the light transmission angle by the light-shielding film, it is possible to control the viewing angle of the user.

Meanwhile, such a light-shielding film may be a light-shielding film that can always control the viewing angle regardless of the surrounding environment or the user's environment, and switchable light-shielding film that allows the user to turn on/off the viewing angle control according to the surrounding environment or the user's environment may be distinguished.

On the other hand, there are various factors that control the characteristics of the switchable light-shielding film having an on-off function. For example, the light absorption rate and movement speed of the light conversion particles included in the light blocking pattern are also related to the characteristics of the light-shielding film.

That is, the driving characteristics of the switchable light-shielding film are changed according to the dispersibility of the light conversion particles and the moving speed of the light conversion particles, and the thickness of the switchable light-shielding film can be controlled according to the light absorption rate of the light conversion particles.

In addition, in the light-shielding film having the on-off function, an adhesive layer may be disposed between the upper substrate and lower substrate. The adhesive layer is a configuration for bonding the upper substrate or the lower substrate, and there is a problem in that the light-shielding ability is reduced according to the characteristics of the adhesive layer.

For example, a sufficient electric field may not be formed in the light-shielding film depending on the electrical characteristics of the adhesive layer. In detail, when the adhesive layer is too thick or the resistance is high, an electric field for controlling the movement of the light conversion particles may not be sufficiently formed. In this case, even when a voltage is applied to the light-shielding film, the moving speed of the light converting particles may be significantly reduced, and accordingly, there is a problem in that it is difficult for the user to effectively control the on and off of the light-shielding function.

In addition, in the light-shielding film having the on-off function, an adhesive layer may be disposed between the upper substrate and lower substrate. The adhesive layer is a configuration for bonding the upper substrate or the lower substrate, and depending on the characteristics of the adhesive layer, there is a problem in that the light-shielding property is reduced or does not operate even when power is applied to the light blocking film.

Therefore, there is a need for a light route control member having improved moving speed and light absorption rate while solving the above problems.

DISCLOSURE

Technical Problem

An embodiment is to provide the light route control member having improved luminance and response speed.

In addition, the embodiment is to provide the light route control member capable of forming a sufficient electric field for the movement of electrophoretic particles.

In addition, the embodiment is to provide the light route control member to which the upper substrate and lower substrate can be effectively adhered.

In addition, the embodiment intends to provide the light route control member capable of preventing the adhesive layer for adhering the upper substrate and lower substrate from being uncured or from reacting with the dispersion.

In addition, the embodiment is intended to provide the light route control member having an improved quality by preventing the deformation of the adhesive layer.

Technical Solution

A light route control member according to an embodiment includes: a first substrate; a first electrode disposed on the first substrate; a second substrate disposed on the first substrate; a second electrode disposed under the second substrate; a light conversion part disposed between the first electrode and the second electrode; and an adhesive layer disposed between the second electrode and the light conversion part, wherein the light conversion part includes a partition wall part and a receiving part alternately disposed, and the receiving part includes a dispersion and a plurality of light absorbing particles disposed in the dispersion, and Log volume resistivity of the adhesive layer is 9 $\Omega$·cm to 15 $\Omega$·cm.

Advantageous Effects

The light route control member according to the embodiment may include a light transmitting part and a light blocking part having a light transmittance that changes according to an applied voltage. Accordingly, the light route control member may be applied in various ways according to a user's usage environment.

In addition, the light route control member according to the embodiment may be provided in a form capable of increasing the amount of light transmitted in the direction of the viewer's viewing surface. Accordingly, the light route control member may have improved front luminance and improved visibility.

In addition, the light route control member according to the embodiment may move easily because the light absorbing particles disposed in the receiving part move from a wide area to a narrow area when a voltage is applied. Accordingly, the light route control member may have improved electrical and optical efficiency.

In addition, the light route control member according to the embodiment may include an adhesive layer in which a monomer and a polymer are mixed, and including at least one additive selected from an antistatic agent, a surfactant, and a conductive polymer. Accordingly, the adhesive layer can be manufactured to have a set log volume resistance, thereby forming a sufficient electric field to control the light conversion part.

In addition, since the adhesive layer can be manufactured to have a set thickness, the upper substrate and lower substrate can be easily adhered to each other through the adhesive layer, and the light conversion part in which the light absorbing particles are accommodated can be effectively covered.

In addition, the adhesive layer according to the embodiment may be cured in a hybrid method to adhere the upper substrate and lower substrate, so that the adhesive layer may have improved quality. In detail, the adhesive layer includes a curable compound that cures in different ways and can be completely cured through a plurality of curing steps. Accordingly, in the process of forming the adhesive layer or bonding the upper substrate and lower substrate through the adhesive layer, it is possible to prevent the adhesive layer from reacting with the dispersion or from being uncured by the dispersion.

In addition, it is possible to prevent the adhesive layer from being elastically deformed during the above processes. Accordingly, it is possible to prevent overflow or separation of the dispersion containing the light absorbing particles by the adhesive layer, and it is possible to effectively cover the upper part of the light conversion part, for example, the receiving part and the partition wall part.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light conversion particle and a light route control member according to an embodiment will be described with reference to drawings. The light route control member described below relates to a switchable light route control member that drives in various modes according to the movement of the light conversion particle application of a voltage.

Figure 1:
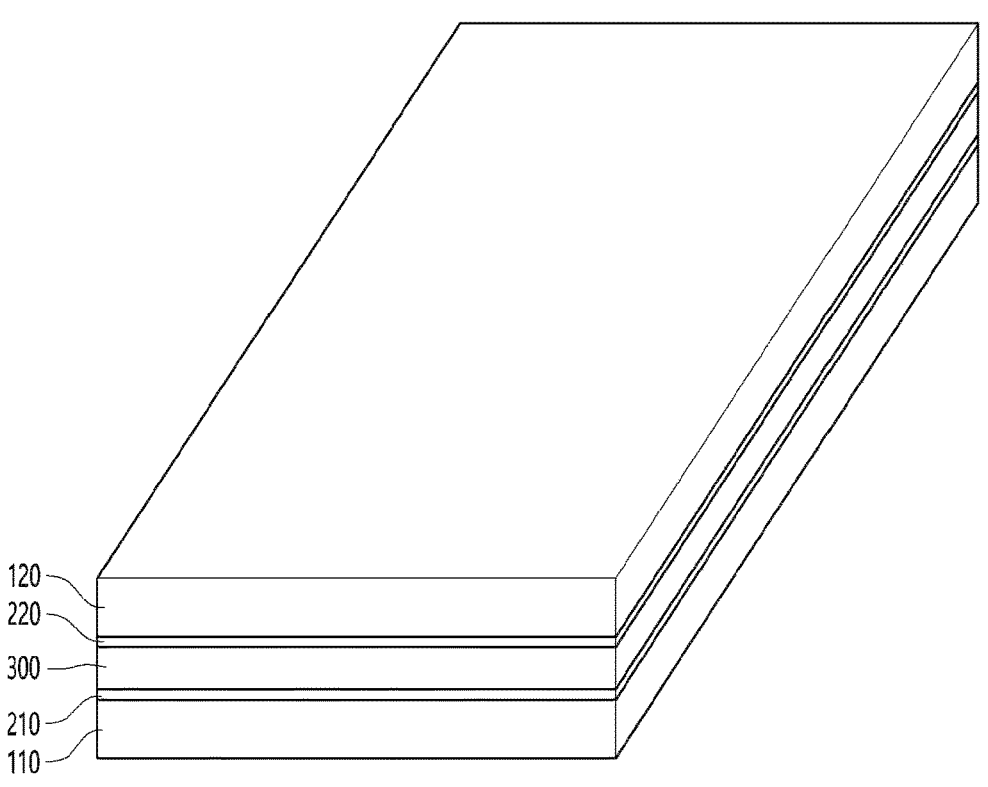
FIG. 1 is a view showing perspective view of a light route control member according to an embodiment.
Figure 2:
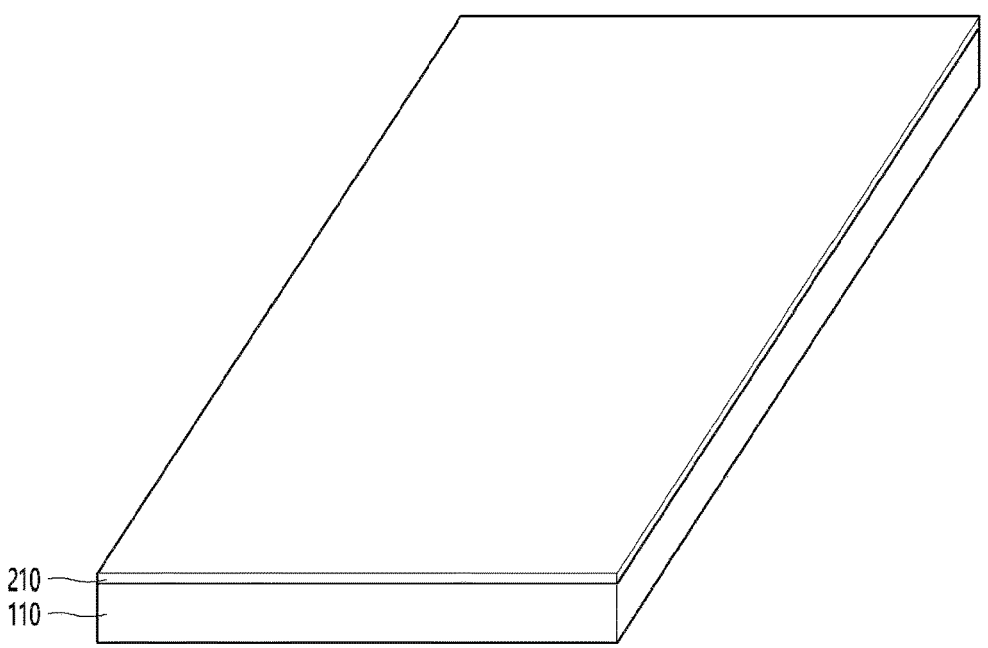
FIGS. 2 and 3 are views showing perspective views of a first substrate and a first electrode and a perspective view of a second substrate and a second electrode of the light route control member according to the embodiment, respectively.
Figure 3:
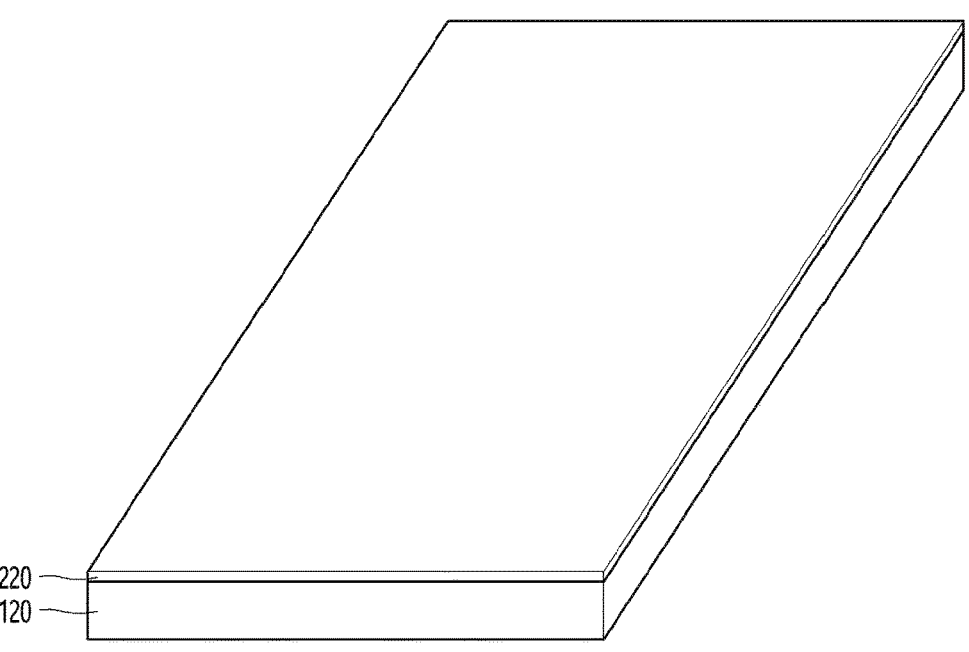

FIG. 1 is a view showing perspective view of a light route control member according to an embodiment, and FIGS. 2 and 3 are views showing perspective views of a first substrate and a first electrode and a perspective view of a second substrate and a second electrode of the light route control member according to the embodiment, respectively.

Referring to FIGS. 1 to 3, a light route control member according to an embodiment may include a first substrate 110, a second substrate 120, a first electrode 210, a second electrode 220, and a light conversion part 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics. Further, the first substrate 110 may be a curved or bended substrate. That is, the light route control member including the first substrate 110 may also be formed to have flexible, curved, or bent characteristics. Accordingly, the light route control member according to the embodiment may be changed to various designs.

The first substrate 110 may have a thickness of 30 um to 80 um.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may be disposed on the first substrate 110 in a film shape. In detail, light transmittance of the first electrode 210 may be about 80% or more.

The first electrode 210 may have a thickness of about 0.1 um to about 0.5 um.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo). gold (Au), titanium (Ti), and alloys thereof.

In addition, the first electrode 210 may include a plurality of conductive patterns. For example, the first electrode 210 may include a plurality of mesh lines intersecting each other and a plurality of mesh openings formed by the mesh lines.

Accordingly, even though the first electrode 210 contains a metal, visibility may be improved because the first electrode is not visible from the outside. In addition, the light transmittance is increased by the openings, so that the brightness of the light route control member according to the embodiment may be improved.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide

6

(PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the light route control member including the second substrate 120 may also be formed to have flexible, curved, or bent characteristics. Accordingly, the light route control member according to the embodiment may be changed to various designs.

The second substrate 120 may have a thickness of 30 mm to 80 mm.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. In addition, the light transmittance of the second electrode 220 may be about 80% or more.

The second electrode 220 may have a thickness of about 0.1 um to about 0.5 um.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo). gold (Au), titanium (Ti), and alloys thereof.

In addition, the second electrode 220 may include a plurality of conductive patterns. For example, the second electrode 220 may include a plurality of mesh lines intersecting each other and a plurality of mesh openings formed by the mesh lines.

Accordingly, even though the second electrode 220 contains a metal, visibility may be improved because the second electrode 220 is not visible from the outside. In addition, the light transmittance is increased by the openings, so that the brightness of the light route control member according to the embodiment may be improved.

The light conversion part 300 may be disposed between the first substrate 110 and the second substrate 120. In detail, the light conversion part 300 may be disposed between the first electrode 210 and the second electrode 220.

Figure 4:
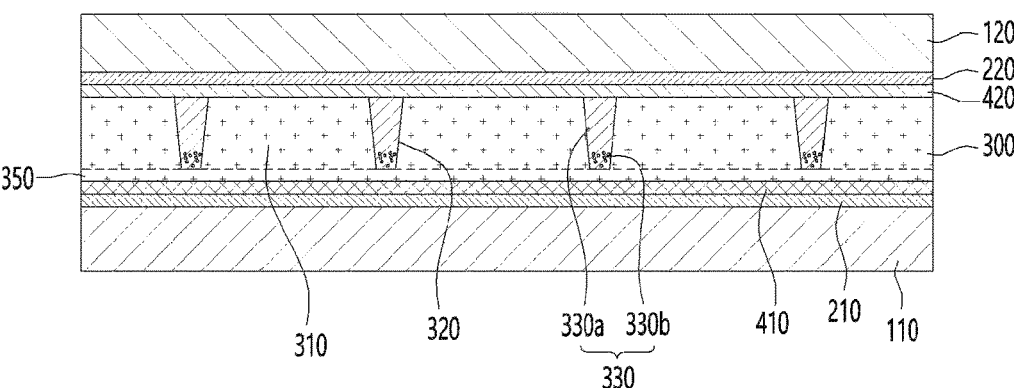
FIGS. 4 and 5 are views showing cross-sectional views of the light route control member according to the embodiment.
Figure 5:
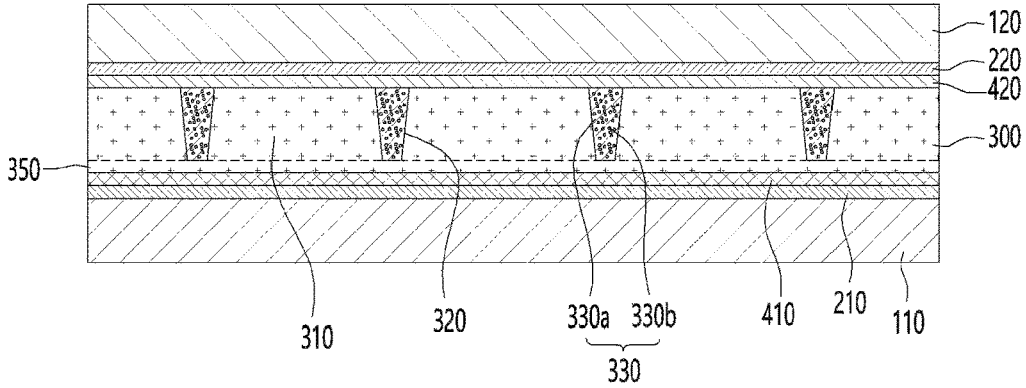

Referring to FIGS. 4 and 5, a buffer layer 410 may be disposed between the light conversion part 300 and the first electrode 210. The buffer layer 410 may improve adhesion between the first electrode 210 made of a different material and the light conversion unit 300.

The adhesive layer 420 may be disposed between the light conversion part 300 and the second electrode 220. The light conversion part and the second electrode 220 may be adhered through the adhesive layer 420.

The buffer layer 410 and the adhesive layer 420 may include a transparent material capable of transmitting light.

For example, the buffer layer 410 may include a transparent resin, and the adhesive layer 420 may include an optically clear adhesive (OCA).

The light conversion part 300 may include a partition wall part 310, a receiving part 320, and a base part 350.

The partition wall part 310 may be defined as a partition wall area dividing the plurality of receiving part 320, and the receiving part 320 may be defined as a region that changes into a light blocking part and a light transmitting part according to the application of a voltage.

The partition wall part 310 may contain a transparent material. The partition wall part 310 may contain a material that may transmit light. For example, the partition wall part 310 may contain a resin material. The partition wall part 310 may contain a photo-curable resin material. As an example, the partition wall part 310 may contain a UV resin or a transparent photoresist resin. Alternatively, the partition wall part 310 may contain urethane resin or acrylic resin.

The partition wall part 310 may transmit light incident on any one of the first substrate 110 and the second substrate 120 toward another substrate.

For example, in FIGS. 4 and 5, light may be emitted from an upper portion of the second substrate 120 to be incident on the second substrate 120. The incident light may pass through the partition wall part 310 and move toward the first substrate 110.

The partition wall part 310 and the receiving part 320 may be alternately disposed. In detail, the partition wall part 310 and the receiving part 320 may be alternately disposed. That is, each of the partition wall parts 310 may be disposed between the receiving parts 320 adjacent to each other, and each of the receiving parts 320 may be disposed between the partition wall parts 310 adjacent to each other. The partition wall part 310 and the receiving part 320 may be disposed in different widths. For example, the width of the receiving part 320 may be greater than the width of the receiving part 320.

The base part 350 may be disposed under the receiving part 320. In detail, the base part 350 may be disposed between the receiving part 320 and the buffer layer 410. Accordingly, the light conversion part 300 may be adhered to the first electrode 210 through the base part 350 and the buffer layer 410. The base part 350 may include the same material as the partition wall part 310. The base part 350 may be integrally formed with the partition wall part 310.

The receiving part 320 may include a light conversion material 330 including a dispersion 330a and light absorbing particles 330b. In detail, the dispersion 330a may be filled in the receiving part 320, and a plurality of light absorbing particles 330b may be dispersed in the dispersion 330a.

The dispersion 330a may be a material for dispersing the light absorbing particles 330b. The dispersion 330a may contain a transparent material. The dispersion 330a may contain a non-polar solvent. In addition, the dispersion 330a may contain a material capable of transmitting light. For example, the dispersion 330a may include at least one of a halocarbon-based oil, a paraffin-based oil, and isopropyl alcohol.

The light absorbing particles 330b may be disposed to be dispersed in the dispersion 330a. In detail, the plurality of light absorbing particles 330b may be disposed to be spaced apart from each other in the dispersion 330a.

The light absorbing particle 330b may be a particle having an electric charge on particle surface. Accordingly, when a voltage is applied to the light route control member 1000, the light absorbing particles 330b may move in the dispersion 330a.

The light absorbing particles 330b may include a material having a color. The light absorbing particles 330b may include a material that absorbs light. In detail, the light absorbing particles 330b may include a black light absorbing material. For example, the light absorbing particles 330b may include carbon black particles.

The light transmittance of the receiving part 320 may be changed by the light absorbing particles 330b. In detail, the receiving part 320 may be changed into a light blocking part and a light transmitting part by changing the light transmittance by the light absorbing particles 330b.

For example, in the light route control member 1000 according to the embodiment changes from a first mode in which transmittance is changed by a voltage applied to the first electrode 210 and the second electrode 220 to a second mode. Or, it may be changed from the second mode to the first mode.

In detail, in the light route control member 1000 according to the embodiment, the receiving part 320 becomes the light blocking part in the first mode, and light of a specific angle may be blocked by the receiving part 320. That is, a viewing angle of the user viewing from the outside may be narrowed.

In addition, in the light route control member 1000 according to the embodiment, the receiving part 320 becomes the light transmitting part in the second mode, and in the light route control member according to the embodiment, light may be transmitted through both the partition wall part 310 and the receiving part 320. That is, the viewing angle of the user viewing from the outside may be widened.

Switching from the first mode to the second mode, that is, the conversion of the receiving part 320 from the light blocking part to the light transmitting part may be realized by movement of the light absorbing particles 330b of the receiving part 320. That is, the light absorbing particles 330b have electric charges on their surface, and may move in the direction of the first electrode 210 or the second electrode 220 by an applied voltage. That is, the light absorbing particles 330b may be electrophoretic particles.

In detail, the receiving part 320 may be electrically connected to the first electrode 210 and the second electrode 220.

In this case, when a voltage is not applied to the light route control member from the outside, the light absorbing particles 330b of the receiving part 320 are uniformly dispersed in the dispersion 330a, and light may be blocked by the light conversion particles in the receiving part 320. Accordingly, in the first mode, the receiving part 320 may be driven as the light blocking part.

Alternatively, when a voltage is applied to the light route control member from the outside, the light absorbing particles 330b may move. For example, the light absorbing particles 330b may move toward one end or the other end of the receiving part 320 by a voltage transmitted through the first electrode 210 and the second electrode 220. That is, the light absorbing particles 330b may move from the receiving part 320 toward the first electrode or the second electrode.

In detail, when a voltage is applied to the first electrode 210 and/or the second electrode 220, an electric field is formed between the first electrode 210 and the second electrode 220, and the charged carbon black, that is, the light absorbing particles may be moved toward a positive electrode of the first electrode 210 and the second electrode 220 using the dispersion 330a as a medium.

That is, when the voltage is applied to the first electrode 210 and/or the second electrode 220, as shown in FIG. 4, the light absorbing particles 330b may be moved toward the first electrode 210 in the dispersion 330a. That is, the light absorbing particles 330b are moved in one direction, and the receiving part 320 may be driven as the light transmitting part.

In addition, when the voltage is not applied to the first electrode 210 and/or the second electrode 220, as shown in FIG. 5, the light absorbing particles 330b may be uniformly dispersed in the dispersion 330a to drive the receiving part 30202 as the light blocking part.

Accordingly, the light route control member according to the embodiment may be driven in two modes according to a user's surrounding environment. That is, when the user requires light transmission only at a specific viewing angle, the receiving unit is driven as the light blocking part, or in an environment in which the user requires high brightness, a voltage may be applied to drive the receiving unit as the light transmitting part.

Therefore, since the light route control member according to the embodiment may be implemented in two modes according to the user's requirement, the light route control member may be applied regardless of the user's environment.

Meanwhile, referring to FIGS. 4 and 5, the receiving part 320 extends from one end of the partition wall part 310 to the other end, and the width of the receiving part 320 may be changed. For example, the receiving part 320 may have a trapezoidal cross-section. In detail, the receiving part 320 may extend from the first electrode 210 to the second electrode 220 and may be formed to widen the width of the receiving part 320.

That is, the width of the receiving part 320 may be narrowed while extending from the light incident part to which the light is incident to the light output part from which the light is emitted. The width of the receiving part 320 may increase while extending from the user's viewing surface to the opposite surface direction.

Accordingly, when a voltage is applied to the light conversion part 300, the light absorbing particles 330b of the receiving part 320 may move in a direction in which the width of the receiving part 320 becomes narrower. Accordingly, since the light absorbing particles 330b move from a wide area to a narrow area, the light absorbing particles 330b may be easily moved. In addition, since the light absorbing particles 330b move to a narrow area of the receiving part, the amount of light transmitted in the direction of the user's viewing surface may be increased, thereby improving frontal luminance.

The receiving part 320 includes a first width defined by a width of a lower region adjacent to the first electrode 210, and a second width defined by a width of an upper region adjacent to the second electrode 220. In addition, the partition wall part 310 may include a third width defined as a width of a lower region adjacent to the first electrode 210. Here, the first width may mean the shortest width of the receiving part 320 and the second width may mean the longest width of the receiving part 320, and the third width may mean the longest width of the partition wall part 310.

Also, the receiving part 320 may include a first height defined as a vertical height of the receiving part 320. In this case, when the height of the receiving part 320 is the same as the height of the partition wall part 310, the first height may be defined as the height of the partition wall part 310.

As described above, the first width may be smaller than the second width. In detail, a ratio (second width/first width) of the second width to the first width may be about 1.8 or less. When the ratio of the second width to the first width exceeds about 1.8, light blocking efficiency in the first mode may decrease, and light transmission efficiency in the second mode may decrease.

In detail, when the ratio of the second width to the first width exceeds 1.8, the inclination angle of the receiving part 320 is increased, so that light at an undesired angle can be blocked in the first mode. And, in the second mode, as the inclination angle is increased, the amount of light transmission may be reduced, and thus the front luminance may be reduced.

Also, a ratio (third width/first width) of the third width to the first width may be about 1.5 or more. When the ratio of the third width to the first width is less than about 1.5, the light blocking efficiency in the first mode and the light transmission efficiency in the second mode may decrease.

In detail, when the ratio of the third width to the first width is less than 1.5, the light transmission amount in the second mode may be reduced due to the reduction of the area through which the light is transmitted, and the front luminance may be reduced.

In addition, a ratio (first height/first width) of the first height of the partition wall part 310 or the receiving part 320 to the first width may be about 4 or more. When the ratio of the first height of the partition wall part 310 or the receiving part 320 to the first width is less than 4, the light blocking efficiency in the first mode and the light transmission efficiency in the second mode may be decrease.

In detail, when the ratio of the first height of the partition wall part 310 or the receiving part 320 to the first width is less than about 4, the angle is not desired in the first mode by the height of the receiving part 320. And, in the second mode, the amount of light transmission may be reduced by the increase of the blocking area, and thus the front luminance may be reduced.

Meanwhile, the receiving part 320 may be disposed to extend in the same or different directions from the width direction or the length direction of the light route control member 1000.

For example, the receiving part 320 may be disposed to extend in the same direction as the width direction of the light route control member 1000. Alternatively, the receiving part 320 may be disposed to extend in a tilting direction at an angle of about 10° or less with respect to the width direction of the light route control member 1000.

Accordingly, when the light route control member 1000 is used together with the display panel, it is possible to prevent a moiré phenomenon due to overlapping of the pattern of the display panel and the receiving part 320 of the light route control member 1000. Thus, the visibility of the user can be improved.

In detail, the display panel may include pixel patterns extending in one direction. Accordingly, the pixel pattern and the pattern of the receiving part 320 of the light route control member 1000 may overlap and the moiré phenomenon may occur. However, by tilting and disposing the pattern of the receiving part 320 at a predetermined angle, such the moiré phenomenon can be prevented.

Meanwhile, as described above, the adhesive layer 420 may be disposed on the light conversion part 300. That is, the adhesive layer 420 may be disposed between the light conversion part 300 and the second electrode 220.

The adhesive layer 420 may have a horizontal width corresponding to that of the light conversion part 300. For example, the adhesive layer 420 may be provided to have the same horizontal width as that of the light conversion part 300 to effectively bond the light conversion part 300 and the second substrate 120.

The adhesive layer 420 may have a set thickness. For example, the adhesive layer 420 may have a thickness of about 1 μm to about 40 μm. In detail, when the thickness of the adhesive layer 420 is less than about 1 the adhesive function may be reduced due to the surface roughness of the substrates (For example, the second electrode 220 and the light conversion part 300) respectively disposed on the upper and lower portions of the adhesive layer 420. Also, when the thickness of the adhesive layer 420 exceeds about 40 μm, the overall thickness of the light route control member 1000 may increase. As a result, the light transmission characteristic of the light route control member 1000 may be reduced. In addition, when the thickness of the adhesive layer 420 exceeds about 40 μm, a sufficient electric field may not be formed in the light conversion part 300. Accordingly, the movement speed and reaction speed of the light absorbing particles 330b may be significantly reduced, and thus the performance of the light route control member 1000 may be reduced.

Preferably, the thickness of the adhesive layer 420 may be about 15 μm to about 30 μm. In this case, the adhesive layer 420 may have sufficient adhesion to the substrates disposed on the upper and lower portions of the adhesive layer 420, and a sufficient electric field for controlling the light absorbing particles 330b may be formed in the light conversion part 300.

Also, the adhesive layer 420 may have a set log volume resistivity. For example, the log volume resistance of the adhesive layer 420 may be about 9 Ω·cm to about 15 Ω·cm. In detail, when the log volume resistance of the adhesive layer 420 is less than about 9 Ω·cm, it may be difficult to effectively control the light absorbing particles 330b. In addition, when the log volume resistance of the adhesive layer 420 exceeds about 15 Ω·cm, the light absorbing particles 330b may not move to an applied voltage. That is, a sufficient electric field for controlling the light absorbing particles 330b may not be formed in the light conversion unit 300. Accordingly, the adhesive layer 420 preferably has the aforementioned thickness and the aforementioned log volume resistance in consideration of adhesive force and electric field formation. More preferably, the log volume resistance of the adhesive layer 420 may be about 11 Ω·cm to about 14 Ω·cm in consideration of electric field formation and effective control of the light absorbing particles 330b.

The adhesive layer 420 may include a plurality of materials. The adhesive layer 420 may include a material capable of transmitting light. For example, the adhesive layer 420 may include a material having a set light transmittance so that the light passing through the light conversion part 300 from the second substrate 120 is emitted in the direction of the first substrate 110. In detail, the adhesive layer 420 may include a material having a light transmittance of about 80% or more. In more detail, the adhesive layer 420 may include a material having a light transmittance of about 85% or more and having excellent haze characteristics.

The adhesive layer 420 may include a resin or silicone material, and a mixture of a monomer and a polymer may be provided. In detail, the adhesive layer 420 may be formed through an adhesive composition in which a monomer and a polymer are mixed.

The adhesive layer 420 may include a monomer having a glass transition temperature Tg of less than about 160 degrees (° C.). For example, the adhesive layer 420 may include at least one monomer of 2-Ethylhexyl Acrylate, 2-Hydroxyethyl Acrylate, Acrylic acid, Isobornyl acrylate, Methyl methacrylate, and Acrylamide.

Here, the monomer may be a factor controlling the fluidity of the adhesive composition. In addition, the monomer may be a factor controlling the log volume resistance value of the adhesive layer 420 to be formed. Accordingly, the monomer may be included in an amount of about 5% by weight or less based on the total weight of the adhesive layer 420. In detail, the monomer may be included in an amount of about 5% by weight or less based on the total weight of the adhesive composition. In more detail, the monomer may be included in an amount of about 0.1 wt % to about 5 wt % based on the total weight of the adhesive composition.

When the monomer is included in less than about 0.1 wt % based on the total weight of the adhesive composition, the adhesive layer 420 may have an excessively high log volume resistance value. For example, in this case, the log volume resistance of the adhesive layer 420 may exceed about 15 Ω·cm. In addition, when the monomer exceeds about 5% by weight based on the total weight of the adhesive composition, it is difficult to control the thickness of the adhesive layer 420 formed by increasing the fluidity of the adhesive composition, and the log volume resistance of the adhesive layer 420 to be manufactured may be too low. For example, in this case, the log volume resistance of the adhesive layer 420 may be less than about 9 Ω·cm.

The adhesive layer 420 may further include an additive. In detail, the adhesive layer 420 may further include at least one additive selected from an antistatic agent, a surfactant, and a conductive polymer.

The antistatic agent may include an ionic liquid or an ionic salt. For example, the antistatic agent may include an ionic liquid containing a fluorine-based anion and an ionic salt. The antistatic agent may include $(n\text{-}C_4H_9)_3(CH_3)N^+$—$N(SO_2CF_3)_2$, $R_4N^+$—$N(SO_2CF_3)$. The antistatic agent may control the log volume resistance of the adhesive layer 420. In detail, the antistatic agent may generate ions in the adhesive layer 420 to reduce the log volume resistance of the adhesive layer 420.

The surfactant may be an ionic surfactant. For example, the surfactant may include at least one of an anionic surfactant, a cationic surfactant, and an amphoteric surfactant. The surfactant may control the log volume resistance of the adhesive layer 420. In detail, cations or anions included in the surfactant may reduce the log volume resistance of the adhesive layer 420.

The conductive polymer may include at least one of polyaniline, polypyrrole, polythiophene, polyacetylene, polyphenylenevinylene, polypyrrole, polythiophene derivative and Poly3,4-ethylenedioxythiophene. The conductive polymer may control the log volume resistance of the adhesive layer 420. In detail, the conductive polymer may reduce the log volume resistance of the adhesive layer 420 by improving the electrical properties of the adhesive layer 420.

The additive may include at least one selected from an antistatic agent, a surfactant, and a conductive polymer. The additive may be included in an amount of about 10% by weight or less based on the total weight of the adhesive layer 420. In detail, the additive may be included in an amount of about 10% by weight or less based on the total weight of the adhesive composition. When the amount of the additive included in the adhesive layer 420 exceeds about 10% by weight, adhesive properties and electrical properties of the adhesive layer 420 may be reduced.

In addition, when the additive includes an antistatic agent including an ionic salt, the antistatic agent may be included in an amount of about 5% by weight or less based on the total weight of the adhesive composition. In detail, when the antistatic agent including the ionic salt exceeds about 5% by weight, the antistatic agent may not be uniformly mixed in the adhesive composition. As a result, electrical properties of the adhesive layer 420 manufactured may be reduced. Accordingly, the content of the additive may preferably satisfy the above-described range.

Meanwhile, the adhesive layer 420 may include a compound. The adhesive layer 420 may include a curable compound. In detail, the adhesive layer 420 may include a photocurable compound capable of photocuring.

The adhesive layer of the photo-curable compound described below may be combined with the description of the adhesive layer described above or may be a separate, independent embodiment. That is, in the following description, an adhesive layer for preventing overflow of the light conversion material inside the receiving part when the light conversion part is adhered through the adhesive layer will be described.

The photo-curable compound may include a photoinitiator of at least one of alpha hydroxy ketone, alpha amino ketone, benzyldimethyl ketal, benzophenone, benzoin ether, thioxanthone, phenyl glyoxylate, acryl phosphine oxide, phenyl glyoxylate, mono acryl phosphine, bis acryl phosphine, benzoin isobutyl ether, benzoylbenzoic acid, benzoyl methyl benzoate, methyl benzoylformate, acetophenone and ethyl anthraquinone.

The photo-curable compound may further include a photosensitizer. In detail, the adhesive layer 420 may further include a photosensitizer capable of activating the photoinitiator by a light source used during curing.

Also, the adhesive layer 420 may include a heat-curable compound capable of being thermally cured. For example, the heat-curable compound may include an azo-based compound, a peroxide, and the like. Specifically, the heat-curable compound may include at least one of azobisisobutyronitrile (AIBN), di-tert-butyl peroxide, peroxybenzoic acid, potassium persulfate, benzoyl peroxide, t-butyl hydroperoxide and t-butylperoxybenzoate.

In addition, the adhesive layer 420 may include a moisture-curable compound capable of curing by moisture. For example, the moisture-curable compound may include at least one of polyisocyanate, Bis(2-dimethylaminoethyl) ether, polyisobutylene, and isobutylene-isoprene copolymer, and diisocyanate.

The adhesive layer 420 may include a plurality of curable compounds that are cured under different conditions. For example, the adhesive layer 420 may include at least two of the compounds described above. In detail, the adhesive layer 420 may include two or more compounds selected from the photo-curable compound, the heat-curable compound, and the moisture-curable compound.

That is, the adhesive layer 420 may be provided in a hybrid method including a curable compound that cures in a different manner.

For example, the adhesive layer 420 may include a photo-curable compound and a heat-curable compound. In this case, the photo-curable compound may be cured by light of a set wavelength band to be applied. In addition, the heat-curable compound may be cured by heat of a set temperature applied. That is, when the adhesive layer 420 includes a photo-curable compound and a heat-curable compound, the adhesive layer 420 may be completely cured after a curing process using a light source and heat.

In this case, the curable compounds cured under different conditions may be mixed in different ratios. For example, the adhesive layer 420 may be formed through an adhesive composition including the curable compound.

In this case, when the adhesive layer 420 is manufactured through a thermal curing process after the photocuring process, the photocurable compound and the heat-curable compound may be mixed at the same or different weight percent with respect to the total weight of the adhesive composition.

In detail, the photo-curable compound and the heat-curable compound may be mixed in a weight % ratio of 4:6 to 7:3 based on the total weight of the adhesive composition.

When the photo-curable compound is mixed in a weight % less than that of the heat-curable compound, for example, less than 4:6, the adhesive composition may not be effectively cured. For this reason, it is difficult for the adhesive composition disposed on the light conversion part 300 to effectively cover the light conversion part 300. Accordingly, the dispersion 330*a* in which the light absorbing particles 330*b* are dispersed may overflow from the receiving part 320.

In addition, when the photo-curable compound is mixed in a weight % greater than that of the heat-curable compound, for example, more than 7:3, the adhesive composition may effectively cover the light conversion part 300. However, the adhesive force between the light conversion part 300 and the substrate (second substrate 120) disposed thereon may be reduced. Accordingly, the reliability of the manufactured light route control member 1000 may be reduced.

Preferably, the photo-curable compound and the heat-curable compound may be mixed in the same weight % ratio with respect to the total weight of the adhesive composition. Accordingly, the adhesive layer 420 can effectively cover the receiving part 320 and effectively adhere the light conversion part 300 and a substrate disposed thereon.

In addition, the adhesive layer 420 may include a photo-curable compound and a moisture-curable compound. In this case, the photo-curable compound may be cured by a light source of a set wavelength band to be applied. In addition, the moisture-curable compound may be cured by a set humidity. That is, when the adhesive layer 420 includes a photo-curable compound and a moisture-curable compound, the adhesive layer 420 may be completely cured after a curing process using a light source and moisture.

At this time, when the adhesive layer 420 is manufactured through a moisture curing process after the light curing process, the photo-curable compound and the moisture-curable compound may be mixed at the same or different weight percent with respect to the total weight of the adhesive composition. In detail, the photo-curable compound and the moisture-curable compound may be mixed in a weight % ratio of 4:6 to 7:3 based on the total weight of the adhesive composition.

When the photo-curable compound is mixed in a weight % less than that of the moisture-curable compound, for example, less than 4:6, the adhesive composition may not be effectively cured. For this reason, it is difficult for the adhesive composition disposed on the light conversion part 300 to effectively cover the light conversion part 300. Accordingly, the dispersion 330*a* in which the light absorbing particles 330*b* are dispersed may overflow from the receiving part 320.

In addition, when the photo-curable compound is mixed in a weight % greater than that of the moisture-curable compound, for example, 7:3, the adhesive composition can effectively cover the light conversion part 300. However, the adhesive force between the light conversion part 300 and the substrate (second substrate 120) disposed thereon may be reduced. Accordingly, the reliability of the manufactured light route control member 1000 may be reduced.

Preferably, the photo-curable compound and the moisture-curable compound may be mixed in the same weight % ratio with respect to the total weight of the adhesive composition. Accordingly, the adhesive layer 420 can effectively cover the receiving part 320 and effectively adhere the light conversion part 300 and a substrate disposed thereon.

In addition, the adhesive layer 420 may include a heat curable compound and a moisture-curable compound. In this case, the heat-curable compound may be cured by heat of a set temperature applied. In addition, the moisture-curable compound may be cured by a set humidity. That is, when the adhesive layer 420 includes a heat-curable compound and a moisture-curable compound, the adhesive layer 420 may be completely cured after a curing process by heat and moisture.

At this time, when the adhesive layer 420 is manufactured through a moisture curing process after the thermal curing process, the heat-curable compound and the moisture curable compound may be mixed at the same or different weight percent with respect to the total weight of the adhesive composition. In detail, the heat-curable compound and the moisture-curable compound may be mixed in a weight % ratio of 4:6 to 7:3 based on the total weight of the adhesive composition.

When the heat-curable compound is mixed in less than that of the moisture-curable compound, for example, in an amount of less than 4:6, the adhesive composition may not be effectively cured. For this reason, it is difficult for the adhesive composition disposed on the light conversion part 300 to effectively cover the light conversion part 300. Accordingly, the dispersion 320a in which the light absorbing particles 320b are dispersed may overflow from the receiving part 320.

In addition, when the heat-curable compound is mixed in a weight % greater than that of the moisture-curable compound, for example, 7:3, the adhesive composition can effectively cover the light conversion part 300. However, the adhesive force between the light conversion part 300 and the substrate (second substrate 120) disposed thereon may be reduced. Accordingly, the reliability of the manufactured light route control member 1000 may be reduced.

Preferably, the heat curable compound and the moisture curable compound may be mixed in the same weight % ratio with respect to the total weight of the adhesive composition. Accordingly, the adhesive layer 420 can effectively cover the receiving part 320 and effectively adhere the light conversion part 300 and a substrate disposed thereon.

Also, the adhesive layer 420 may include a plurality of heat-curable compounds. For example, the adhesive layer 420 may include a first heat-curable compound cured by light of a first wavelength band and a second heat-curable compound cured by light of a second wavelength band different from the first wavelength. In this case, the adhesive layer 420 may be completely cured after undergoing a curing process using lights of different wavelength bands.

At this time, when the adhesive layer 420 is manufactured by a plurality of curing processes using light of different wavelengths, the first heat-curable compound and the second heat-curable compound may be mixed at the same or different weight percent with respect to the total weight of the adhesive composition. In detail the first heat-curable compound and the second heat-curable compound may be mixed in a weight % ratio of 4:6 to 7:3 based on the total weight of the adhesive composition.

When the first heat-curable compound is mixed in a weight % less than that of the second heat-curable compound, for example, less than 4:6, the adhesive composition may not be effectively cured. For this reason, it is difficult for the adhesive composition disposed on the light conversion part 300 to effectively cover the light conversion part 300. Accordingly, the dispersion 330a in which the light absorbing particles 330b are dispersed may overflow from the receiving part 320.

In addition, when the first heat-curable compound is mixed in an amount exceeding that of the second heat-curable compound by weight, for example, 7:3, the adhesive composition can effectively cover the light conversion part 300. However, the adhesive force between the light conversion part 300 and the substrate (second substrate 120) disposed thereon may be reduced. Accordingly, the reliability of the manufactured light route control member 1000 may be reduced.

Preferably, the first heat-curable compound and the second heat-curable compound may be mixed in the same weight % ratio with respect to the total weight of the adhesive composition. Accordingly, the adhesive layer 420 can effectively cover the receiving part 320 and effectively adhere the light conversion part 300 and a substrate disposed thereon.

That is, the adhesive layer 420 according to the embodiment may include a plurality of curable compounds that are cured in different ways. Accordingly, the light conversion part 300 may be effectively covered by partially curing the adhesive composition applied on the light conversion part 300 to a set degree. In addition, after disposing the substrate (the second substrate 120) on the light conversion part 300, the adhesive composition may be completely cured to effectively bond the light conversion part 300 and the second substrate 120. Therefore, the dispersion 330a containing the light absorbing particles 330b due to the non-curing of the adhesive layer 420 or elastic deformation of the adhesive layer 420 can be prevented from overflowing or separated from the receiving part 320.

Hereinafter, referring to FIGS. 6 to 10, a display device and a display apparatus to which the light route control member according to an embodiment is applied will be described.

Figure 6:
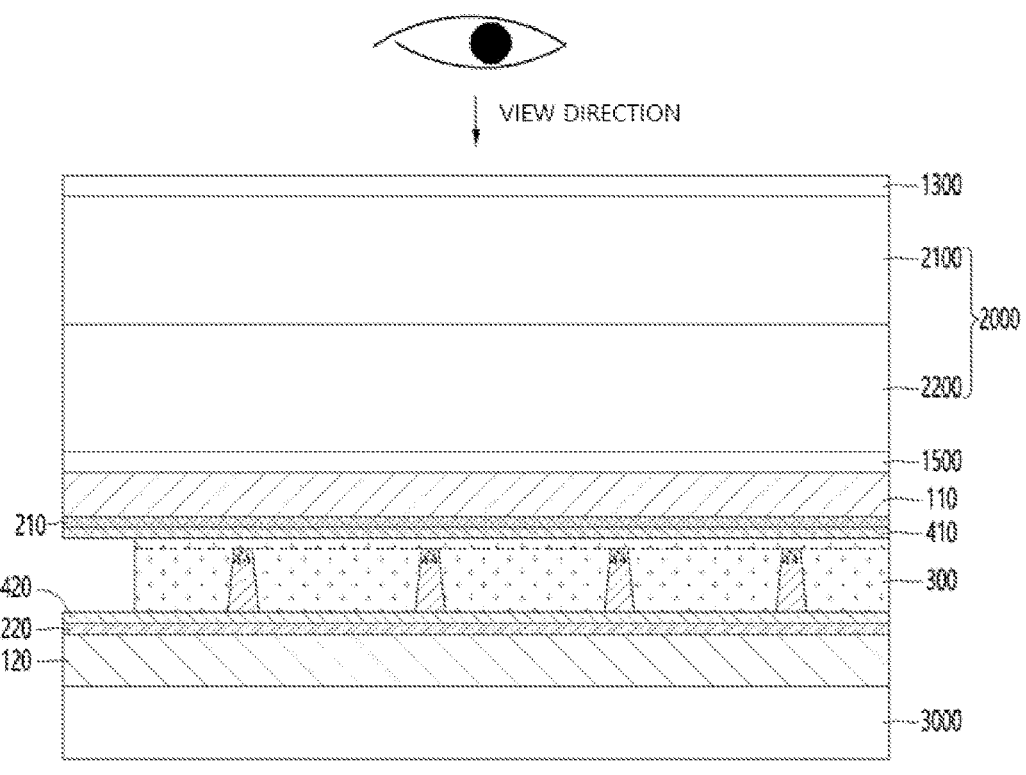
FIGS. 6 and 7 are views showing cross-sectional views of a display device to which a light route control member according to an embodiment is applied.
Figure 7:
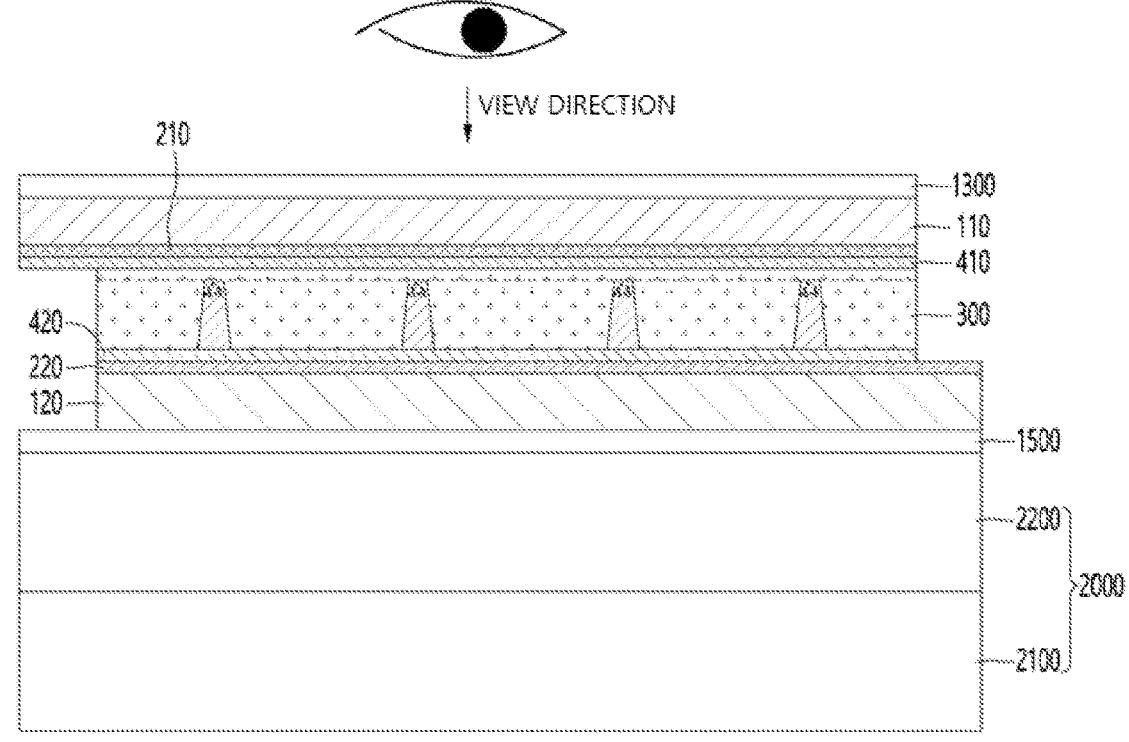

Referring to FIGS. 6 and 7, the light route control member 1000 according to an embodiment may be disposed on or under display panel 2000.

The display panel 2000 and the light route control member 1000 may be disposed to be adhered to each other. For example, the display panel 2000 and the light route control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the light route control member and the display panel, the light route control member and the display panel may be adhered after the release film is removed.

Meanwhile, referring to FIGS. 6 and 7, one end or one end and the other end of the light route control member may protrude, and the light conversion part may not be disposed on the protruding portion. The protrusion region is an electrode connection portion to which the first electrode 210 and the second electrode 220 are exposed, and may connect an external printed circuit board and the light route control member through the electrode connection portion.

The display panel 2000 may include a first substrate 2100 and a second substrate 2200. When the display panel 2000 is a liquid crystal display panel, the light route control member may be formed under the liquid crystal panel. That is, when the user-viewed side of the liquid crystal panel is defined as the upper portion of the liquid crystal panel, the light route control member may be disposed under the liquid crystal panel. The display panel 2000 may be formed in a structure in which the first substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at the first substrate 2100 and the second substrate 2200 is bonded to the first substrate 2100 with the liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, the black matrix may be omitted, and a common electrode may be formed to function as the black matrix.

In addition, when the display panel 2000 is the liquid crystal display panel, the display device may further include a backlight unit providing light from a rear surface of the display panel 2000.

That is, as shown in FIG. 6, the light route control member is disposed below the liquid crystal panel and above the backlight unit 3000, and the light route control member may be disposed between the backlight unit 3000 and the display panel 2000.

Alternatively, as shown in FIG. 7, when the display panel 2000 is an organic light emitting diode panel, the light route control member may be formed on the organic light emitting diode panel. That is, when the surface viewed by the user of the organic light emitting diode panel is defined as the upper portion of the organic light emitting diode panel, the light route control member may be disposed on the organic light emitting diode panel. the display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, the second substrate 2200 configured to function as an encapsulation substrate for encapsulation may further be included on the organic light emitting element.

That is, the light emitted from the display panel 2000 or the backlight unit 3000 may move from the second substrate 120 of the light route control member to the first substrate 110.

Furthermore, although not shown in drawings, a polarizing plate may be further disposed between the light route control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting display panel, the polarizing plate may be the external light reflection preventive polarizing plate.

In addition, an additional functional layer 1300 such as an anti-reflection layer, an anti-glare, or the like may be further disposed on the light route control member 1000. Specifically, the functional layer 1300 may be adhered to one surface of first substrate 110 of the light route control member. Although not shown in drawings, the functional layer 1300 may be adhered to the first substrate 110 of the light route control member via an adhesive layer. In addition, a release film for protecting the functional layer may be further disposed on the functional layer 1300.

Further, a touch panel may be further disposed between the display panel and the light route control member.

Although it is shown in the drawings that the light route control member is disposed at an upper portion of the display panel, but the embodiment is not limited thereto, and the light route control member may be disposed at various positions such as a position in which light is adjustable, that is, a lower portion of the display panel, between a second substrate and a first substrate of the display panel, or the like.

In addition, in the drawings, the light conversion part of the light route control member according to the embodiment is shown in a direction parallel or perpendicular to the outer surface of the second substrate, but the light conversion part may be formed to be inclined at a predetermined angle from the outer surface of the second substrate. Accordingly, a moire phenomenon occurring between the display panel and the light route control member may be reduced.

Figure 8:
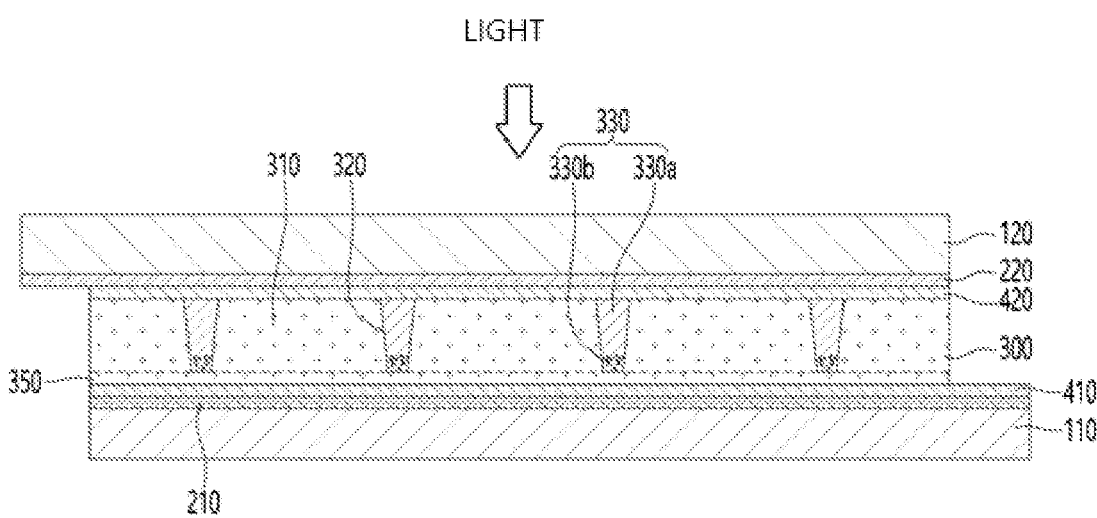
FIGS. 8 to 10 are views for describing one embodiment of the display device to which the light route control member according to the embodiment is applied.
Figure 8:
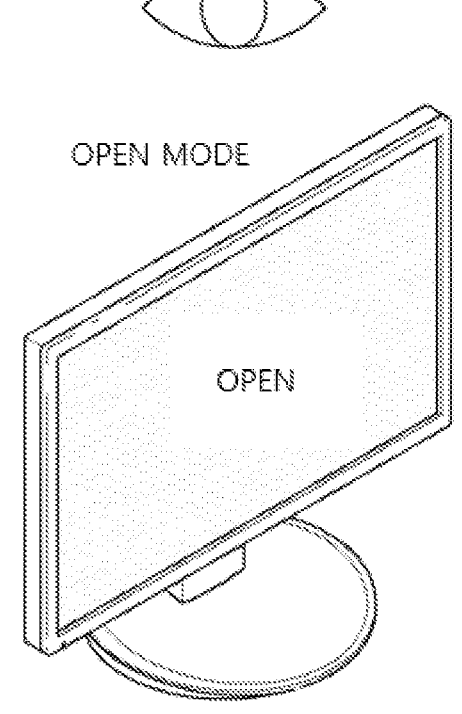
Figure 9:
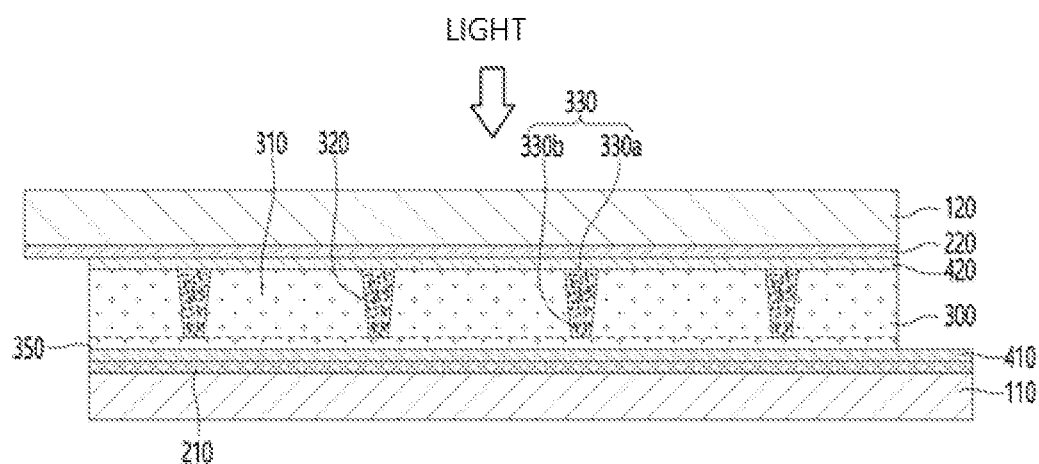
Figure 9:
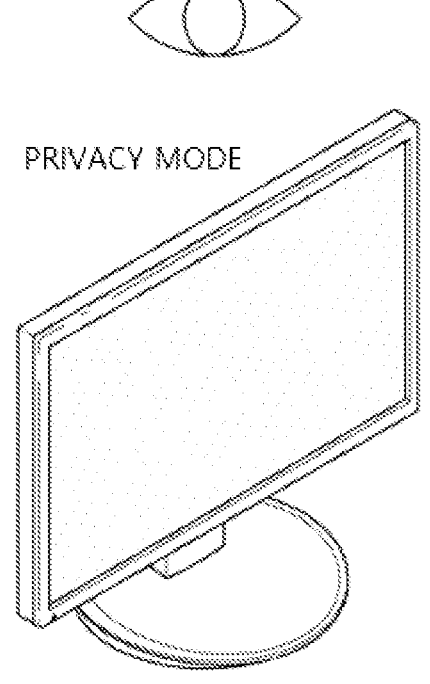
Figure 10:
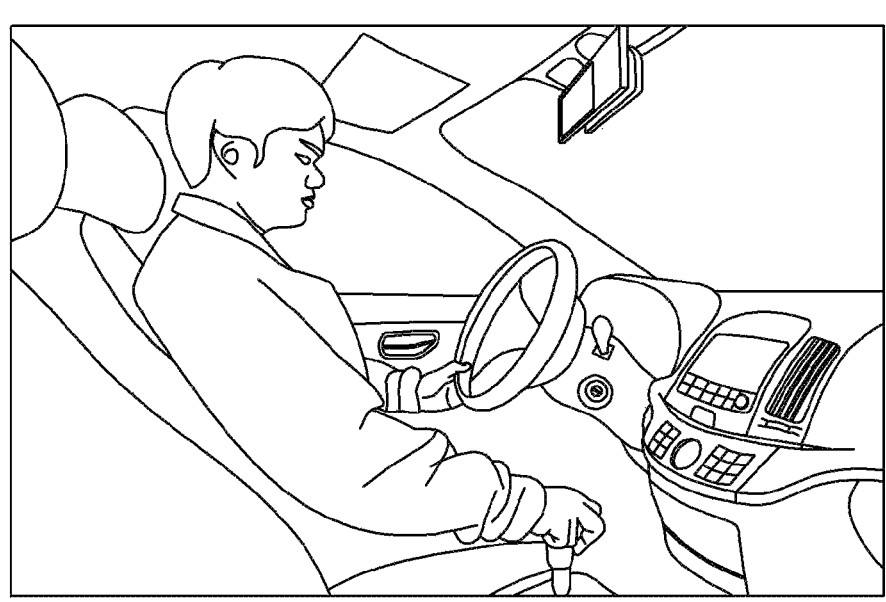

Referring to FIGS. 8 to 10, the light route control member according to the embodiment may be applied to various display devices.

Referring to FIGS. 8 to 10, the light route control member according to the embodiment may be applied to a display device that displays a display.

For example, when power is not applied to the light route control member as shown in FIG. 8, the receiving unit functions as the light blocking part, so that the display device is driven in a light blocking mode, and when power is applied to the light route control member as shown in FIG. 9, the receiving unit functions as the light transmitting part, so that the display device may be driven in an open mode.

Accordingly, a user may easily drive the display device in a privacy mode or a normal mode according to application of power.

The light emitted from the backlight unit or the self-luminous device may move from the first substrate to the second substrate. Alternatively, the light emitted from the backlight unit or the self-luminous device may also move from the second substrate to the first substrate.

In addition, referring to FIG. 10, the display device to which the light route control member according to the embodiment is applied may also be applied inside the vehicle.

For example, the display device including the light route control member according to the embodiment may display a video confirming information of the vehicle and a movement route of the vehicle. The display device may be disposed between a driver seat and a passenger seat of the vehicle.

In addition, the light route control member according to the embodiment may be applied to a dashboard that displays a speed, an engine, an alarm signal, and the like of the vehicle.

Furthermore, the light route control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light route control member comprising:
a first substrate;
a first electrode disposed on the first substrate;
a second substrate disposed on the first substrate;
a second electrode disposed under the second substrate;
a light conversion part disposed between the first electrode and the second electrode, and
an adhesive layer disposed between the second electrode and the light conversion part,
wherein the light conversion part includes a partition wall part and a receiving part that are alternately arranged,
wherein the receiving part includes a dispersion and a plurality of light absorbing particles disposed in the dispersion,
wherein a shortest width of the receiving part is a first width,
wherein a longest width of the receiving part is a second width,
wherein a longest width of the partition wall part is a third width,
wherein a height of the partition wall part is a first height,
wherein a ratio of the third width to the first width is 1.5 or more,
wherein a ratio of the first height to the first width is 4 or more, and
wherein the adhesive layer includes at least two curable compounds that are cured under different conditions among a photo-curable compound, a heat-curable compound, and a moisture-curable compound.

2. The light route control member of claim 1, wherein the adhesive layer includes a monomer,
wherein the monomer includes at least one of 2-Ethylhexyl Acrylate, 2-Hydroxyethyl Acrylate, Acrylic acid, Isobornyl acrylate, Methyl methacrylate, and Acrylamide.

3. The light route control member of claim 2, wherein the monomer is included in an amount of 0.1 wt % to 5 wt % based on the total weight of the adhesive layer.

4. The light route control member of claim 2, wherein the adhesive layer may further include at least one additive selected from an antistatic agent, a surfactant, and a conductive polymer.

5. The light route control member of claim 4, wherein the additive is included in an amount of 10% by weight or less based on the total weight of the adhesive layer.

6. The light route control member of claim 1, wherein the thickness of the adhesive layer is 1 $\mu$m to 40 $\mu$m.

7. The light route control member of claim 1, wherein the thickness of the adhesive layer is 15 $\mu$m to 30 $\mu$m.

8. The light route control member of claim 1, wherein a light transmittance of the adhesive layer is 80% or more.

9. The light route control member of claim 1, wherein the receiving part changes in light transmittance according to an applied voltage, and changes into a light transmitting part when the voltage is not applied, and into a light blocking part when the voltage is applied.

10. The light route control member of claim 9, wherein the light absorbing particles move toward the first electrode or the second electrode when the voltage is applied.

11. A light route control member comprising:
a first substrate;
a first electrode disposed on the first substrate;
a second substrate disposed on the first substrate;
a second electrode disposed under the second substrate;
a light conversion part disposed between the first electrode and the second electrode, and
an adhesive layer disposed between the second electrode and the light conversion part,
wherein the light conversion part includes a partition wall part and a receiving part that are alternately arranged,
wherein the receiving part includes a dispersion and a plurality of light absorbing particles disposed in the dispersion,
wherein the adhesive layer includes at least two curable compounds that are cured under different conditions among a photo-curable compound, a heat-curable compound, and a moisture-curable compound.

12. The light route control member of claim 11, wherein the adhesive layer includes two compounds selected from the photo-curable compound and the heat-curable compound, the photo-curable compound and the moisture-curable compound, the heat-curable compound, and the moisture-curable compound.

13. The light route control member of claim 12, wherein the adhesive layer has a thickness of 1 $\mu$m to 100 $\mu$m.

14. The light route control member of claim 12, wherein the adhesive layer includes the photo-curable compound and the heat-curable compound, and includes the photo-curable compound and the heat-curable compound in a weight % ratio of 4:6 to 7:3.

15. A display device comprising:
a panel including at least one of a display panel and a touch panel; and
a light route control member disposed on the panel
wherein the light route control member includes:
a first substrate;
a first electrode disposed on the first substrate;
a second substrate disposed on the first substrate;
a second electrode disposed under the second substrate;
a light conversion part disposed between the first electrode and the second electrode, and
an adhesive layer disposed between the second electrode and the light conversion part,
wherein the light conversion part includes a partition wall part and a receiving part that are alternately arranged,
wherein the receiving part includes a dispersion and a plurality of light absorbing particles disposed in the dispersion,
wherein a shortest width of the receiving part is a first width,
wherein a longest width of the receiving part is a second width, wherein a longest width of the partition wall part is a third width, wherein a height of the partition wall part is a first height, wherein a ratio of the third width to the first width is 1.5 or more, wherein a ratio of the first height to the first width is 4 or more, and wherein the adhesive layer includes at least two curable compounds that are cured under different conditions among a photo-curable compound, a heat-curable compound, and a moisture-curable compound.

16. The display device of claim 15, wherein the adhesive layer includes a monomer, wherein the monomer includes at least one of 2-Ethylhexyl Acrylate, 2-Hydroxyethyl Acrylate, Acrylic acid, Isobornyl acrylate, Methyl methacrylate, and Acrylamide.

17. The display device of claim 15, wherein the panel includes a backlight unit and a liquid crystal display panel, wherein the light route control member is disposed between the backlight unit and the liquid crystal display panel; and wherein a light emitted from the backlight unit moves from the second substrate to the first substrate.

18. The display device of claim 15, wherein the panel includes an organic light emitting diode panel, wherein the light route control member is disposed on the organic light emitting diode panel, and wherein a light emitted from the organic light emitting diode panel moves from the second substrate to the first substrate.

* * * * *